Aug. 1, 1961 B. E. L. KÄLLSSON 2,994,741

SIGNAL TRANSMITTING REPEATER

Filed Dec. 19, 1957 3 Sheets-Sheet 1

INVENTOR

Bengt Erik Lennart KÄLLSSON

BY Toulmin & Toulmin

ATTORNEYS

INVENTOR
Bengt Erik Lennart KÄLLSSON

BY Toulmin & Toulmin
ATTORNEYS

Aug. 1, 1961 B. E. L. KÄLLSON 2,994,741

SIGNAL TRANSMITTING REPEATER

Filed Dec. 19, 1957 3 Sheets-Sheet 3

INVENTOR

Bengt Erik Lennart KÄLLSSON

BY Toulmin & Toulmin

ATTORNEYS

United States Patent Office 2,994,741

Patented Aug. 1, 1961

2,994,741
SIGNAL TRANSMITTING REPEATER

Bengt Erik Lennart Källsson, Kallforsvagen 12, Bandhagen, Stockholm, Sweden

Filed Dec. 19, 1957, Ser. No. 703,805
5 Claims. (Cl. 178—70)

Figure 1:
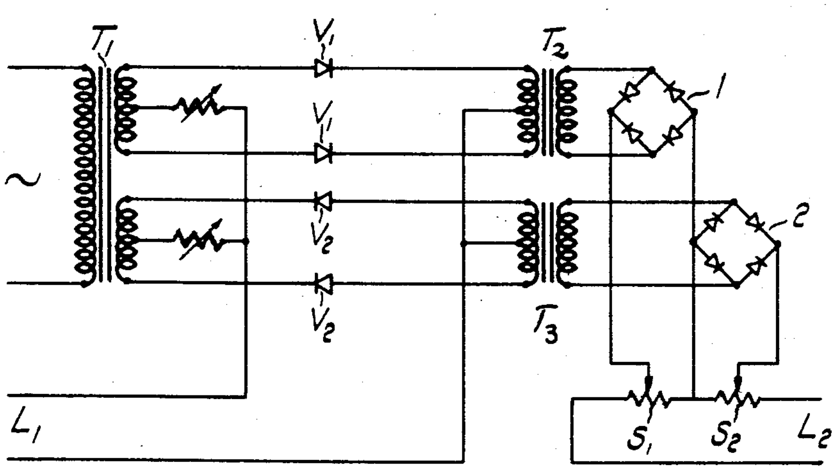

The present invention relates to a signal transmitting repeater controlled by an incoming signal line carrying pulsating D.C.-signal impulses of alternating polarities.

Such repeaters may be used in long telegraph or telephone lines, and other signal carrying lines, where it is necessary to amplify the signals sent for instance from an impulse sender, or a teleprinter by inserting regularly spaced repeaters in the transmission line.

Repeaters of the said kind must be able to repeat the signals without perceptible distortion and in certain cases also in corrected form. It is thus an object of the invention to improve signal transmitting repeaters in these respects.

Another object of the invention is a repeater in which the input and output circuits are galvanically separated and which further is able to work also if there should appear disturbances from outside such as vibrations, humidity etc.

The present invention exceedingly complies with said demands and has reference to a signal transmitting repeater arranged to repeat D.C.-signal impulses of alternating polarities sent out by telegraph senders, teleprinters, relay transmitters or the like over a signal line and includes two mutually parallel A.C.-circuits connected in parallel to the said line, said parallel circuits being at their input fed from an alternating voltage source and also provided with alternating voltage blocking and unblocking elements.

Owing to the connection in parallel between the signal line and both of the parallel alternating current circuits as well as to the alternating current blocking and unblocking elements the incoming D.C.-signals control the circuits in such a way that while one of them is closed for A.C.-voltage the other is opened and vice versa.

It is further of particular importance for a correct operation of the repeater according to the invention, that the local alternating voltage source is connected to the inputs of both of the parallel circuits over a transformer with two secondary windings, and that each of the outputs of the said circuits is connected to the primary winding of a transformer individually allotted to each of said circuits, and that further the secondary windings of the said output transformers are individually connected to full wave rectifying bridges which rectify the A.C. voltage, passing through only one parallel circuit at a time, in such a way, that owing to the rectifying direction chosen for the different rectifying elements there will appear D.C.-signals of one polarity at the output of one of the bridges, and D.C.-signals of the opposite polarity at the output of the other bridge.

It should also be noted, that according to the invention both of the outputs of the rectifying bridges should be connected to the outgoing signal line over voltage distributing or dividing means so as to enable the transmission of only one of the above mentioned D.C.-signals of alternating polarities at a time over the said line.

The insensibility against outside disturbances obtained by means of the invention, will appear most clearly if a repeater according to the same is used for replacing certain hitherto used polarized or unpolarized relays in for instance telegraph repeaters, automatic telephone repeaters, etc.

Some of the advantages of the proposed arrangement are given below:

It is possible to use a higher speed of operation. It further requires less maintenance work than arrangements using polarized relays, for instance.

Polarized relays require a regular maintenance and are very sensitive for instance against damp, dust and moisture, while the suggested arrangement can be made insensitive against such disturbances.

The circuits of the repeater according to the invention are galvanically separated from each other.

Suitable choice of rectifying elements and operating currents in dependence of the characteristics of said elements can also give an impulse correction.

The nature of the invention will be more fully understood from the following description of five different modifications of the invention chosen as examples out of the fullness of possible different performances. In the said description reference is made to the accompanying drawings in which—

Figure 2A:
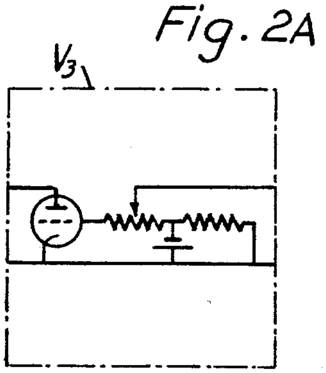
Figure 2:
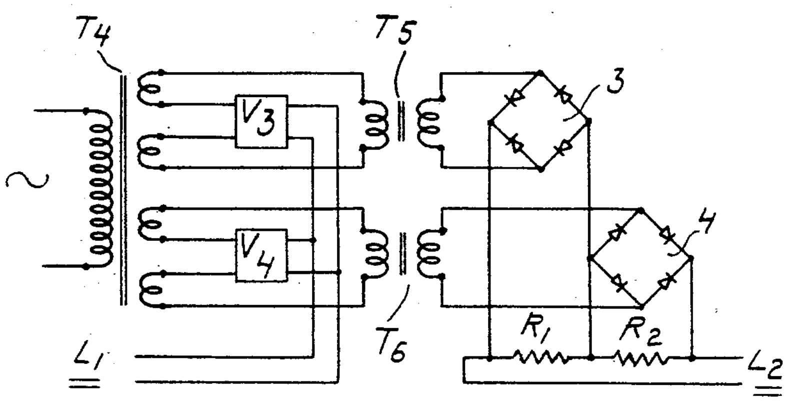
Figure 3:
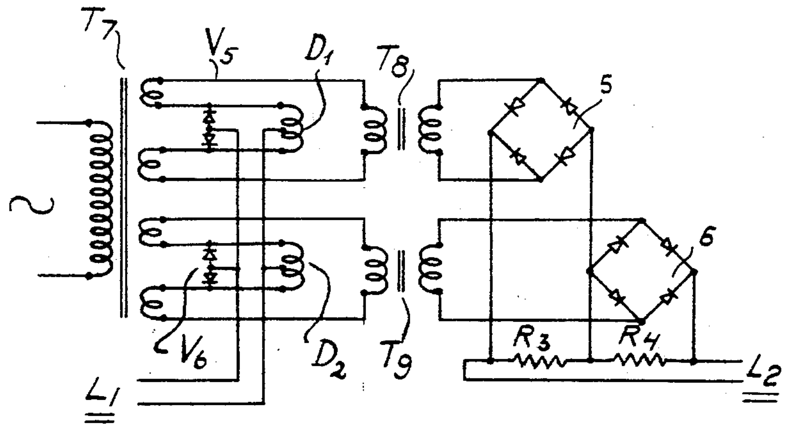
Figure 4:
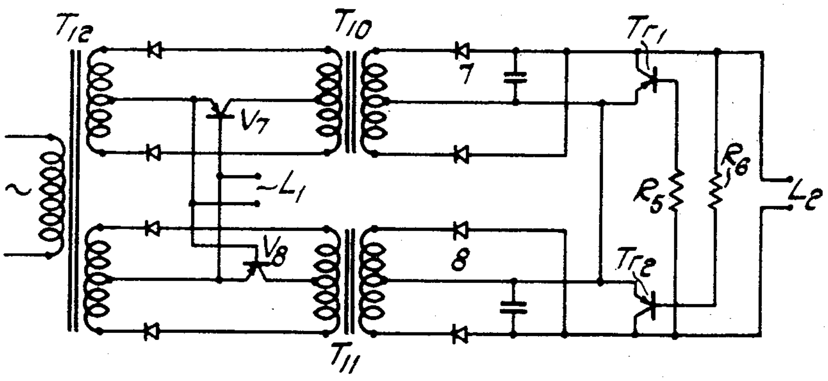
Figure 5:
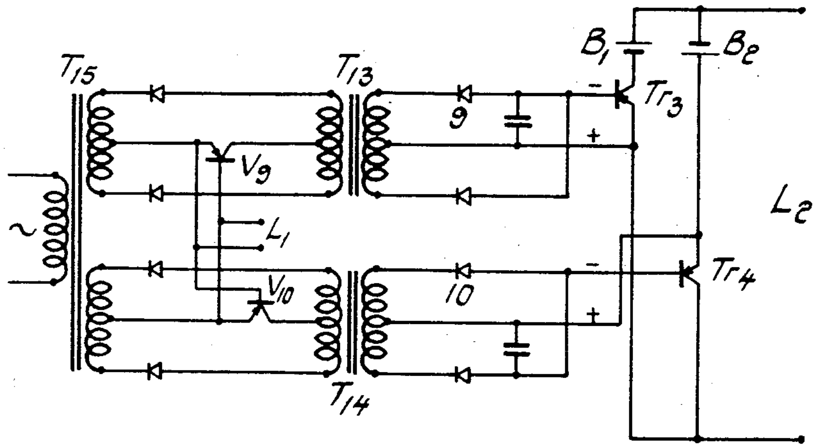

FIG. 1 shows a performing example of the arrangement according to the invention in connection with telegraph repeaters, in which the A.C.-blocking and unblocking elements consist of metallic oxide rectifiers, FIG. 2 an arrangement of a similar type, where A.C.-blocking and unblocking elements consist of valves such as electron tubes, for instance diodes etc., and with rectifying bridges connected to an outgoing signal line by means of resistances, FIG. 3 still another arrangement similar to that according to FIG. 1 with modified connecting up of the valves, FIGS. 4 and 5 show a preferred embodiment of the invention of two slightly different modifications in which the rectifying bridges are connected to the outgoing signal line over transistors.

It is common to the solutions shown in FIGS. 1–5 that an incoming signal line $L_1$ is supposed to be connected to a sender of D.C.-signal impulses of alternating polarity and length, for instance a telegraph sender and that an outgoing signal line $L_2$ is supposed to be connected to a signal receiver for such impulses for instance a telegraph receiving apparatus or the like which has to work in synchronism with the sending apparatus.

Thus the output from the repeater in all said embodiments is equal to the sum of the inputs to the repeater from the incoming signal line and from the local A.C.-source. It is desirable that the alternating voltage impressed upon a transformer $T_1$ should have a frequency, which is considerably higher than the frequency with which the incoming direct current is varying.

In FIG. 1 two mutually parallel circuits are shown which are fed from a local alternating current source over two secondary windings of a transformer $T_1$, the said windings being individually allotted to the said circuits. In each circuit there are further alternating current blocking and unblocking elements consisting of valves $V_1$ and $V_2$ inserted in every conductor of the circuits, the valves $V_1$ of one of the circuits having a direction of working opposite to that of the valves $V_2$ of the other circuit. The said valves or rectifying elements are in this embodiment supposed to be metallic oxide rectifiers.

The outputs of the said parallel circuits are connected to primary windings of transformers $T_2$ and $T_3$ individually allotted to the above mentioned parallel circuits.

The said circuits are further connected in parallel to the incoming signal line in such a way, that one branch of the said line is connected in parallel to the center taps of the secondary windings of the transformer $T_1$, while the other branch is connected to the center taps of the primary windings of the transformers $T_2$ and $T_3$.

The secondary windings of these transformers are connected to full wave rectifying bridges 1 and 2 individually allotted to the said transformers $T_2$ and $T_3$ respectively. The rectifying elements of the bridges 1 and 2 are directed so that the D.C.-signals of alternating polarities occurring at the output of one of the rectifying bridges are of a polarity opposite to that occurring in the other rectifying bridge.

The outputs of the bridges 1 and 2 shown in FIG. 1 are further connected to the outgoing signal line $L_2$ over voltage dividing resistances $S_1$ and $S_2$ inserted in the said line in such a way that the terminals of the rectifying bridges having negative polarity are brought together.

The operation of the shown arrangement is as follows:

When there are no signals in the incoming signal line $L_1$ and the same thus is broken, no current is transmitted from the transformer $T_1$ to either of the transformers $T_2$ or $T_3$.

As soon, however, as D.C.-signal impulses of alternating polarities appear in the incoming signal line 1 the rectifiers $V_1$ and $V_2$ are alternatively opened for a current composed by the D.C.-signal of the one or the other polarity and the superposed alternating current from the local alternating current source.

The alternating voltage from the transformer $T_1$ is then closed by means of the rectifiers $V_1$ or $V_2$ over primary windings of the transformers $T_2$ or $T_3$ respectively, each of the secondary windings of which being connected to a rectifying bridge 1 or 2 respectively so as to produce a full wave rectifying of the alternating voltage from the transformer $T_1$.

Owing partly to the fact that the terminals of the bridges carrying the same potential, for instance negative potential, are interconnected and partly to the fact that the voltages of the bridges by means of voltage dividing resistances $S_1$ and $S_2$ are introduced into the outgoing signal line $L_2$ in series, the corrected D.C.-signals will appear on the outgoing signal line $L_2$ as D.C.-signals of alternating polarities.

Referring now to FIG. 2 the modification shown there may be said principally to be in accordance with the arrangement shown in FIG. 1. The difference consists therein that there are two secondary windings of the transformer $T_4$ for each alternating current circuit and that the said windings and each primary winding of the transformers $T_5$ and $T_6$ are interconnected by means of valves $V_3$ and $V_4$ respectively. The said valves, which are inserted between the open center tap terminals of each secondary winding of the input transformer $T_4$ may consist of electron tubes, cold cathode tubes, transistors, diodes or similar elements free from inertia. The incoming signal line is connected in parallel to the valves $V_3$ and $V_4$.

As to the arrangement according to FIG. 3 it also may be said principally to be in accordance with that of FIG. 1. Also in this case the valves are metallic oxide rectifiers. The difference consists in the secondary windings of the primary transformer $T_7$ in the same way as in the arrangement according to FIG. 2 having open center tap terminals and in a parallel connection of two valves $V_5$, $V_6$ and two impedances $D_1$, $D_2$ being inserted between said terminals. Each of the valves consists of two metallic oxide rectifiers of opposite polarities connected in series. The center taps between each pair of rectifiers are connected in parallel to one branch of the incoming signal line and the center taps of both of the impedances likewise in parallel to the other branch of the said line. The impedance coils $D_1$ and $D_2$ should have an impedance which is great enough to prevent the alternating voltage from closing alternating current circuits over the transformers $T_8$ and $T_9$ respectively and thus to prevent an actuating of the rectifier bridges 5 and 6 when no signals appear on the signal line $L_1$ and the same thus is broken.

In the embodiments according both to FIGS. 2 and 3 the connection of the rectifying bridges 3, 4 and 5, 6 to the outgoing signal line is performed in parallel to resistances $R_1$, $R_2$ and $R_3$, $R_4$ respectively. The said resistances can also be performed as voltage dividers thus enabling a regulation of the outgoing voltage level.

The operation of the arrangements according to FIGS. 2 and 3 is principally in accordance with the operation of the repeater according to FIG. 1.

In FIG. 4 a preferred embodiment of the invention is shown, which is principally in accordance with the arrangement shown in FIG. 1. There is, however, a difference which consists therein that the center taps of the secondary windings of the transformer $T_{12}$ and the center taps of the primary windings of the transformers $T_{10}$ and $T_{11}$ are electrically interconnected by means of valves $V_7$ and $V_8$ respectively. The secondary windings of the transformers $T_{10}$ and $T_{11}$ are each connected to a rectifying bridge 7 and 8 respectively, the output voltage of which is conducted over the emitter-collector circuit of the transistors $Tr_1$ and $Tr_2$ respectively. One terminal of each rectifying bridge is thus connected to one branch of the outgoing signal line $L_2$ and the collector base electrodes of one of the transistors in series with a resistance interconnected between the other terminal of each of the said bridges 7 or 8 respectively and the branch of the outgoing signal line connected to a terminal of the other bridge.

Through suitable bias voltage resistances $R_5$, $R_6$ in the base circuits of each of the transistors $Tr_1$, $Tr_2$ respectively a shunting of the other inactive rectifying bridge is thus obtained.

The functioning of the arrangement according to FIG. 4 is as follows.

It may first be supposed that the voltage obtained at the emitter electrode of the transistor $Tr_1$ from the transformer $T_{10}$ is positive. The upper terminal of the secondary winding will then have negative potential and so will also the base of the transistor $Tr_2$. The path over the emitter and collector of this transistor will thus be opened and the following circuit be obtained. From the center tap of the upper secondary winding of transformer $T_{10}$ over the emitter-collector electrodes of $Tr_2$ the lower branch of $L_2$, the upper branch of $L_2$ and the upper terminal of the secondary winding of the transformer $T_{10}$. If instead a positive voltage is obtained on the center tap of the secondary winding of the transformer $T_{11}$ the emitter-collector path of the transistor $Tr_1$ is opened negative voltage being fed to the base of the said transistor over the resistance $R_5$ thus opening the emitter-collector circuit of this transistor.

The arrangement according to FIG. 5 substantially corresponds to that according to FIG. 4. The output connections of each of the rectifying bridges, however, has been altered so that the rectified voltage is used for controlling the transistors $Tr_3$ and $Tr_4$ respectively. D.C. voltage sources $B_1$ and $B_2$ of opposite direction being inserted alternatively between one terminal of each bridge and one branch or the other of the outgoing signal line. This is obtained thereby that a center tap point of the secondary winding of one of the output transformers $T_{13}$ and $T_{14}$ is connected to one of the branches of the outgoing signal line $L_2$ and the center tap of the other secondary winding to the other branch of said line $L_2$ and that two transistors $Tr_3$ and $Tr_4$ are connected with their bases, one, $Tr_3$, to the one rectifying bridge 9 and the other, $Tr_4$, to the other bridge 10, the emitter electrode of one of the transistors, $Tr_3$, being connected to the center tap of the secondary winding of the transformer $T_{13}$ and the other, $Tr_4$, to the center tap of the secondary winding of the other transformer $T_{14}$, the collector electrodes being over D.C.-current sources of opposite polarities connected to opposite branches of the outgoing signal line $L_2$.

In a practical performance of the invention with a local alternating current source of 50 c./s. the circuit $L_1$ had an outer resistance of about 2,000 ohms and a current of 0.1 amp., and the circuit $L_2$ an outer resistance of about 2,000 ohms and a current of 0.1 amp.

In telegraph repeaters the alternating voltage connected to the first transformer ($T_1$, $T_4$, $T_7$, $T_{12}$ or $T_{15}$ respectively) ought to have a frequency of 800–1,000 c./s.

What I claim is:

1. An amplifying and correcting signal transmitting repeater for incoming pulsating D.C.-signals of alternating polarities, comprising in combination a local A.C.-source supplying the energy necessary for the amplification of D.C.-signals, an input transformer having a primary winding connected to said local A.C.-source and a pair of secondary windings, a modulating device consisting of two mutually parallel A.C.-circuits, each having its input connected to a secondary winding of said transformer, an output transformer connected to the output of each A.C.-circuit, an incoming signal line carrying incoming D.C.-signals and connected to both of said parallel A.C.-circuits so as to control each of them by means of the D.C.-signals over a phantom circuit formed by the two wires of the A.C.-circuit, each parallel A.C.-circuit comprising two electric valves of the same conducting direction which are opened for the A.C. when the controlling D.C. corresponds to their conducting direction but which are totally blocking the A.C. when the controlling D.C. has a direction opposite to their conducting direction, a demodulating device comprising two rectifying bridges each of which is connected to the output of the corresponding A.C.-circuit through said corresponding second transformer, the rectifying elements of the bridges being so directed that the direct signals of alternating polarities occurring at the output of one rectifying bridge are of a polarity opposite to that occurring in the other rectifying bridge, voltage divider means connected to the output of said demodulator, and an outgoing signal line connected to the output of said demodulator through said voltage divider means so as to enable the transmission of only one of the said D.C.-signals of alternating polarities at a time over the said outgoing line.

2. An amplifying and correcting signal transmitting repeater according to claim 1, wherein said input transformer has center taps in each secondary winding, said electric valves of each A.C.-circuit are connected between said separated phantom center taps of said input transformer.

3. An amplifying and correcting signal transmitting repeater for incoming pulsating D.C.-signals of alternating polarities, comprising in combination a local A.C.-source supplying the energy necessary for the amplification of D.C.-signals, an input transformer having a primary winding connected to said local A.C.-source and a pair of secondary windings, a modulating device consisting of two mutually parallel A.C.-circuits, each having its input connected to a secondary winding of said transformer, an output transformer connected to the output of each A.C.-circuit, an incoming signal line carrying incoming D.C.-signals and connected to both of said parallel A.C.-circuits so as to control each of them by means of the D.C.-signals over a phantom circuit formed by the two wires of the A.C.-circuit, said phantom circuits comprising center taps at the secondary windings of said input transformer, each phantom circuit comprising center taps at the secondary windings of said input transformer and at the primary windings of said output transformers, electric valve means interconnecting said center tap points and connected in parallel to said incoming signal line, each parallel A.C.-circuit comprising two electric valves of the same conducting direction which are opened for the A.C. when the controlling D.C. corresponds to their conducting direction but which are totally blocking the A.C. when the controlling D.C. has a direction opposite to their conducting direction, a demodulating device comprising two rectifying bridges each of which is connected to the output of the corresponding A.C.-circuit through said corresponding second transformer, the rectifying elements of the bridges being so directed that the direct signals of alternating polarities occurring at the output of one rectifying bridge are of a polarity opposite to that occurring in the other rectifying bridge, and an outgoing signal line connected to the output of said demodulator.

4. An amplifying and correcting signal transmitting repeater for incoming pulsating D.C.-signals of alternating polarities, comprising in combination a local A.C.-source supplying the energy necessary for the amplification of D.C.-signals, an input transformer having a primary winding connected to said local A.C.-source and a pair of secondary windings, a modulating device consisting of two mutually parallel A.C.-circuits, each having its input connected to a secondary winding of said transformer, an output transformer connected to the output of each A.C.-circuit, an incoming signal line carrying incoming D.C.-signals and connected to both of said parallel A.C.-circuits so as to control each of them by means of the D.C.-signals over a phantom circuit formed by the two wires of the A.C.-circuit, each parallel A.C.-circuit comprising two electric valves of the same conducting direction which are opened for the A.C. when the controlling D.C. corresponds to their conducting direction but which are totally blocking the A.C. when the controlling D.C. has a direction opposite to their conducting direction, a demodulating device comprising two rectifying bridges each of which is connected to the output of the corresponding A.C.-circuit through said corresponding second transformer, the rectifying elements of the bridges being so directed that the direct signals of alternating polarities occurring at the output of one rectifying bridge are of a polarity opposite to that occurring in the other rectifying bridge, an outgoing signal line connected to the output of said demodulator, one terminal of each rectifying bridge being connected to one branch of said outgoing line, and a transistor and a resistance in series therewith interconnected between the other terminal of each of said rectifying bridges and the branch of said outgoing signal line connected to a terminal of the other bridge so as to enable the transmission of only one of said D.C.-signals of alternating polarities at a time over said outgoing signal line.

5. An amplifying and correcting signal transmitting repeater for incoming pulsating D.C.-signals of alternating polarities, comprising in combination a local A.C.-source supplying the energy necessary for the amplification of D.C. signals, an input transformer having a primary winding connected to said local A.C.-source and a pair of secondary windings, a modulating device consisting of two mutually parallel A.C.-circuits, each having its input connected to a secondary winding of said transformer, an output transformer connected to the output of each A.C.-circuit, an incoming signal line carrying incoming D.C. signals and connected to both of said parallel A.C.-circuits so as to control each of them by means of the D.C. signals over a phantom circuit formed by the two wires of the A.C.-circuit, said phantom circuits comprising center taps at the secondary windings of said input transformer, each phantom circuit comprising center taps at the secondary windings of said input transformer and at the primary windings of said output transformers, electric valve means interconnecting said center tap points and connected in parallel to said incoming signal line, each parallel A.C.-circuit comprising two electric valves of the same conducting direction which are opened for the A.C. when the controlling D.C. corresponds to their conducting direction but which are totally blocking the A.C. when the controlling D.C. has a direction opposite to their conducting direction, a demodulating device comprising two rectifying bridges each of which is connected to the output of the corresponding A.C.-circuit through said corresponding second transformer, the rectifying elements of the bridges being so directed that the direct signals of alternating polarities occurring at the output of one rectifying bridge are of a polarity opposite to that occurring in the other rectifying bridge, an outgoing signal line connected to the output of said demodulator, one terminal of each rectifying bridge being connected to one branch of said outgoing line, and a transistor and a resistance in series therewith interconnected between the other terminal of each of said rectifying bridges and the branch of said outgoing signal line connected to a terminal of the other bridge so as to enable the transmission of only one of said D.C.-signals of alternating polarities at a time over said outgoing signal line.

References Cited in the file of this patent

UNITED STATES PATENTS

| | | |
|---|---|---|
| 1,428,156 | Espenschied | Sept. 5, 1922 |
| 2,126,529 | Black | Aug. 9, 1938 |
| 2,594,007 | Gardere | Apr. 22, 1952 |

FOREIGN PATENTS

| | | |
|---|---|---|
| 107,180 | Australia | Apr. 12, 1939 |